United States Patent [19]

Lieb

[11] Patent Number: 5,651,529

[45] Date of Patent: Jul. 29, 1997

[54] REDUCED NOISE DISK VALVE ASSEMBLY

[75] Inventor: George W. Lieb, North Kingstown, R.I.

[73] Assignee: The United States of America as represented by the Secretary of the Navy, Washington, D.C.

[21] Appl. No.: 640,578

[22] Filed: Apr. 28, 1996

[51] Int. Cl.⁶ ........................................ F16K 47/14
[52] U.S. Cl. ........................................ 251/127
[58] Field of Search ........................ 251/127, 118; 138/43

[56] References Cited

U.S. PATENT DOCUMENTS 3,920,044  11/1975  Gruner .................... 251/127 X
4,335,744   6/1982  Bey ........................ 251/127 X
4,549,718  10/1985  Seger ...................... 251/127 X Primary Examiner—Kevin Lee
Attorney, Agent, or Firm—Michael J. McGowan; James M. Kasischke; Prithvi C. Lall

[57] ABSTRACT

A noise and shock reducing assembly are provided. When used as part of a disk valve assembly, the present invention includes a disk and a valve plate with a valve orifice passing therethrough. A perforated bellows is disposed about the valve orifice between the disk and the valve plate. An actuator moves the disk linearly with respect to the valve plate in one of a first direction and a second direction to cause compression or expansion of the bellows. The restrictive flow path presented by a combination of the folded side walls of the bellows and the perforations therein provide for a gradual increase or decrease in downstream pressure and flow during the opening or closing of the valve.

15 Claims, 2 Drawing Sheets

REDUCED NOISE DISK VALVE ASSEMBLY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to valve assemblies, and more particularly to a disk valve assembly having a perforated bellows to reduce operational noise.

(2) Description of the Prior Art

Flow induced hydraulic valve noise can be attributed to the noise produced during the shifting of the valve (such as a disk valve) from the closed to the open position, the noise produced when the valve is fully opened, and the noise produced when the valve is closed. The noise generated during the opening and closing of a valve under pressure has often been identified as the greatest flow induced noise.

When a valve is opened, noise can be attributed to the sudden pressure rise downstream of a valve which results in three possible noise events. The first of these noise events is the pressure transient itself that impacts the piping and excites flexural vibration modes. The second is the possible cavitation of the fluid through the valve orifice, i.e., the high initial flow velocity through the orifice plate causes a pressure drop below the fluid vapor pressure. The third possible noise event is the high velocity turbulent flow through the valve that occurs when it is initially opened. The fluctuating pressures associated with the turbulent boundary layer can excite flexural vibrations of the piping.

When a valve is suddenly closed, the momentum of the fluid is absorbed by the expansion of the upstream piping. The sudden load will also transmit a pressure wave through the piping (known as water hammer) and possibly excite flexural modes of the piping. A second source of noise at closure is cavitation. Just downstream of the valve, cavitation can occur due to the sudden drop in static pressure from the momentum of the downstream fluid mass being rapidly retarded.

SUMMARY OF THE INVENTION

Accordingly, it is an object of the present invention to reduce the noise associated with the shifting positions of a fluid valve such as a disk valve.

Another object of the present invention is to reduce the noise generated during the opening of a disk valve by gradually increasing the downstream pressure.

Still another object of the present invention is to reduce the noise generated during the closing of a disk valve by gradually reducing the flow rate through the valve and downstream pressure.

Other objects and advantages of the present invention will become more obvious hereinafter in the specification and drawings.

In accordance with the present invention, a noise and shock reducing assembly are provided. When used as part of a disk valve assembly, the present invention includes a disk and a valve plate with a valve orifice passing therethrough. A bellows is disposed about the valve orifice between the disk and the valve plate. The bellows has side walls with perforations passing therethrough. An actuator cooperates with the disk for moving the disk linearly with respect to the valve plate in one of a first direction and a second direction. When the disk is moved in the first direction, the disk causes compression of the bellows. When the disk is moved in the second direction, the disk permits expansion of the bellows. The restrictive flow path presented by a combination of the folded side walls of the bellows and the perforations therein provide for a gradual increase or decrease in downstream pressure and flow during the opening or closing of the valve.

In terms of using the present invention as a shock reducing assembly in a fluid environment, a first planar surface and a second planar surface oppose one another. The perforated bellows of the present invention is disposed between the first planar surface and the second planar surface. The fluid environment within and around the bellows, in cooperation with the size, shape and number of perforations in the bellows, determines the amount of shock absorption of a transient load when the distance between the first planar surface and the second planar surface is reduced to compress the bellows.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1C:
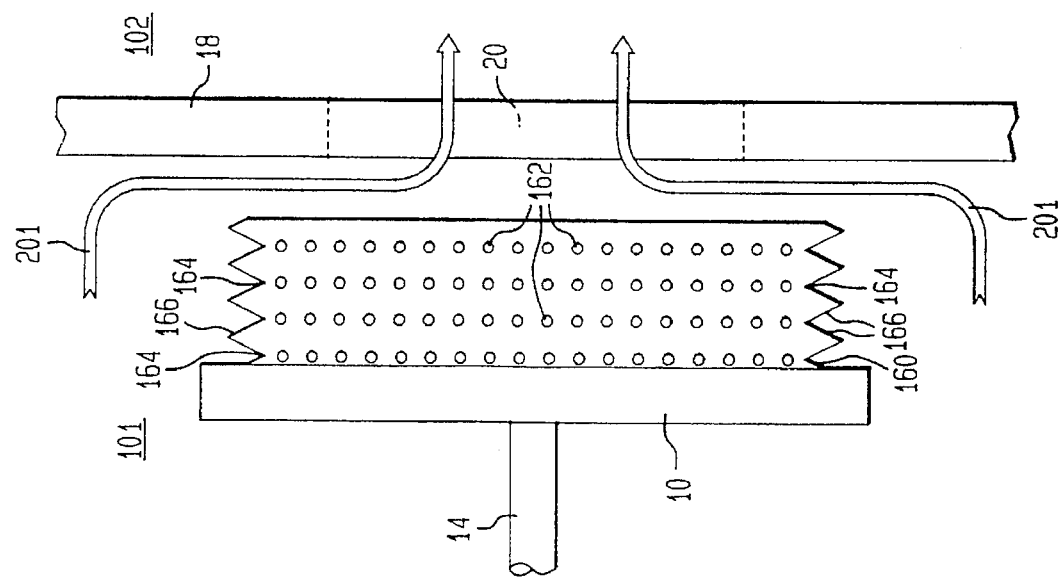
FIG. 1C is a side view of the valve assembly in the fully open position.
Figure 1B:
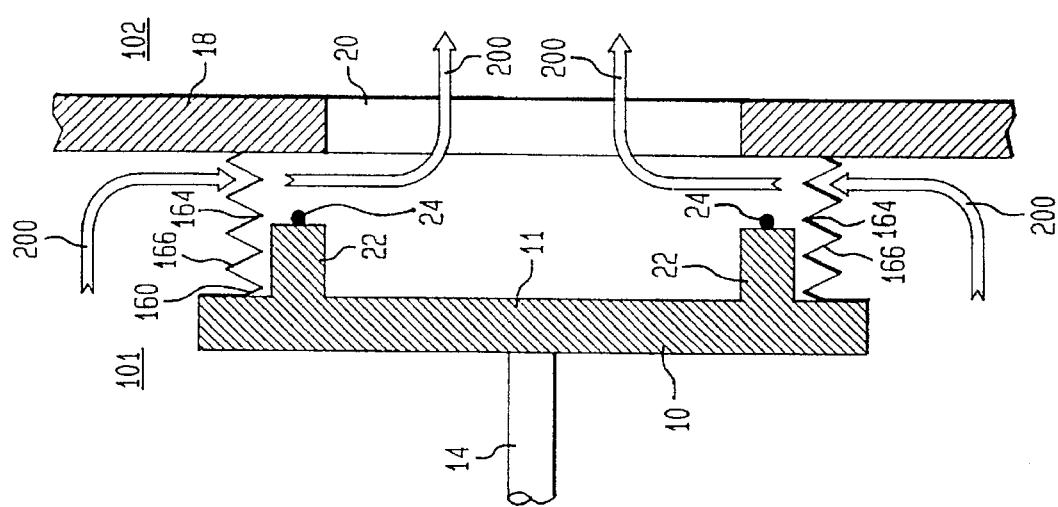
FIG. 1B is a cross-sectional view of the valve assembly in the partially open position.
Figure 1A:
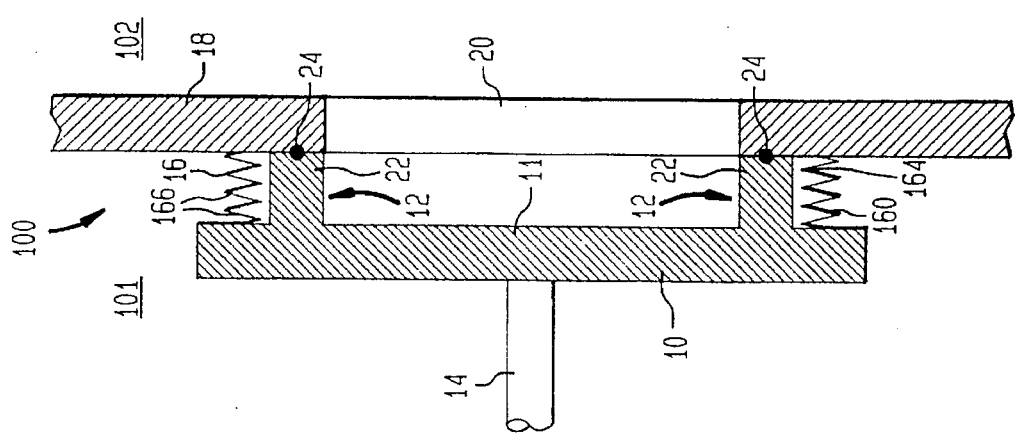
FIG. 1A is a cross-sectional view of one embodiment of the valve assembly of the present invention in the closed position.

Referring now to the drawings, and more particularly to the sequence depicted in FIGS. 1A, 1B and 1C, one embodiment of the noise reducing valve assembly of the present invention is shown and referenced generally by numeral 100. In each of FIGS. 1A, 1B and 1C, like reference numerals are used for common elements. Valve assembly 100 is shown closed in FIG. 1A, partially open in FIG. 1B and fully open in FIG. 1C. Briefly, valve assembly 100 includes disk 10, seal assembly 12, actuator 14, bellows 16 and valve plate 18.

In the preferred embodiment, disk 10 is a planar disk and valve plate 18 has valve orifice 20 passing therethrough to thereby comprise a standard disk valve assembly. However, as will be explained further below, the present invention can also be used as part of a shock reducing assembly that dissipates shock between two planar surfaces moving towards engagement with one another.

Disk 10 is sized large enough to cover valve orifice 20. The material, size and geometry of disk 10 are not critical in terms of the principles of the present invention. Valve plate 18 separates upstream flow region 101 from downstream flow region 102. Accordingly, valve orifice 20 can be contoured to provide favorable entry and exit geometries. The material, size and geometry of valve plate 18 are determined from the operating pressure, flow rate, fluid properties, etc., and do not affect the inventive principles of the present invention.

Actuator 14 represents any device for imparting a motive force that linearly moves disk 10 towards or away from valve plate 18. Accordingly, actuator 14 can be realized by a linearly driven actuator rod, a spring or any other device capable of supplying the necessary motive force. Obviously, actuator 14 can be positioned on either side of disk 10. Seal assembly 12 consists of annular ridge 22 depending from or integral with face 11 of disk 10 opposing valve plate 18. Annular ridge 22 has an inside diameter larger than valve orifice 20 and a height sufficient to allow bellows 16 to be fully collapsed between disk 10 and valve plate 18 as shown in FIG. 1A. While annular ridge 22 is shown supporting O-ring 24, other suitable designs are possible. For example, O-ring 24 could be supported on valve plate 18 about valve orifice 20 in alignment with annular ridge 22. In either case, O-ring 24 can be any conventional sealing gasket material.

In the illustrated example, bellows 16 is attached on end 160 to face 11 about annular ridge 22 and is thus large enough to cover valve orifice 20. If, for example, bellows 16 is a metal such as spring steel, bronze, etc., attachment of end 160 is by any suitable metal attaching technique such as welding, brazing, bolting, adhesive, etc. A plurality of perforations 162 are provided in bellows 16 along each inwardly facing fold crease 164 of bellows 16 as best seen in FIG. 1C. Perforations 162 can be circular or oblong holes or slits. Additional perforations (not shown) can be provided in surfaces 166 of bellows 16. The material for and size of bellows 16 are determined by factors that include the number and size of perforations 162, operating pressure, opening/closing time of valve assembly 100, the amount of travel of disk 10, flow rate, fluid properties and size of disk 10.

In describing the operation of the present invention, it will be assumed that valve assembly 100 starts in the closed position depicted in FIG. 1A. That is, bellows 16 is compressed such that perforations 162 are sealed or closed to fluid flow by means of the compressed state of bellows 16. O-ring 24 provides a positive seal between annular ridge 22 and valve plate 18 thereby preventing any flow from upstream flow region 101 to downstream flow region 102. When valve assembly 100 is to be opened, actuator 14 moves disk 10 away from valve plate 18. As the opening process begins as shown in FIG. 1B, bellows 16 starts to expand. An initial flow path between regions 101 and 102 is thus made available as perforations 162 become exposed when bellows 16 expands. This initial flow path is represented in FIG. 1B by arrows 200. However, bellows 16 is still in contact with valve plate 18 as disk 10 is being moved away from valve plate 18. Thus, a high fluid resistance encountered by flow 200 prevents displacement of large volumes of fluid from region 101 to pass through valve orifice 20. The high fluid resistance is due to the restrictive flow path presented by the folds of bellows 16 and presence of perforations 162 which have been exposed at inwardly facing creases 164.

As disk 10 moves further from valve plate 18, bellows 16 continues to expand to expose a greater area of the perforations 162. In this way, hydraulic resistance decreases as flow rate increases. The end result is a gradual increase in pressure and flow rate in downstream flow region 102. As the pressure in downstream flow region 102 approaches the upstream pressure, disk 10 is further displaced relative to valve plate 18 until bellows 16 is unseated from valve plate 18 as depicted in FIG. 1C. At this point, flow between regions 101 and 102 is unrestricted through valve orifice 20 as represented by flow arrows 201.

When valve assembly 100 is to be closed, the above-described process is reversed. Briefly, bellows 16 makes contact with valve plate 18 as disk 10 approaches valve plate 18. At contact, fluid resistance is due only to perforations 162 in bellows 16 as bellows 16 is fully extended. As disk 10 causes bellows 16 to be compressed, fluid resistance gradually increases as the areas of perforations 162 are reduced and then sealed between the compressing folds 166 of bellows 16. Once again, the gradual increase in resistance provides a controllable decrease in fluid momentum and downstream pressure to effectively reduce noise associated with cavitation and water hammer.

The advantages of the present invention are numerous. The perforated bellow allows a gradual increase or decrease in the downstream pressure and flow in a disk valved piping system. A gradual increase or decrease in downstream pressure will reduce flow induced noise during the opening or closing cycles that results from cavitation, turbulence and sudden impact.

Figure 2:
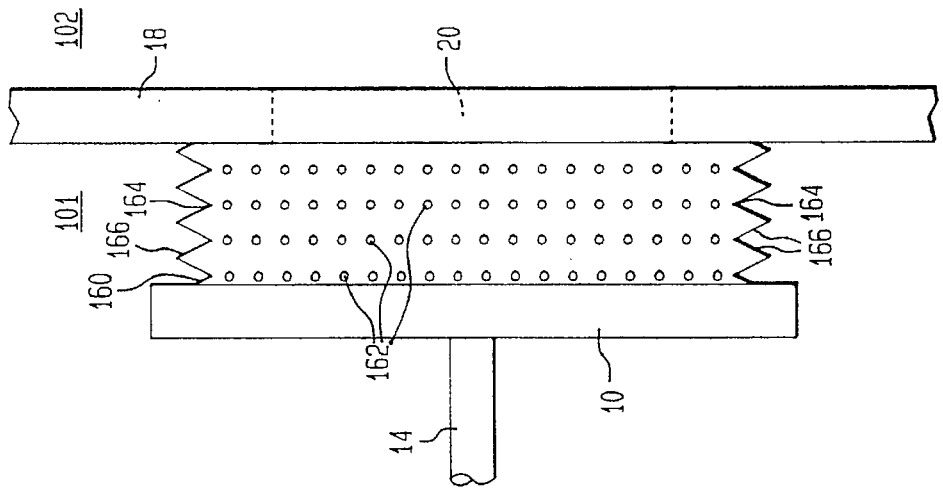
FIG. 2 is a side view of another valve assembly construction in the fully open position.
Figure 3:
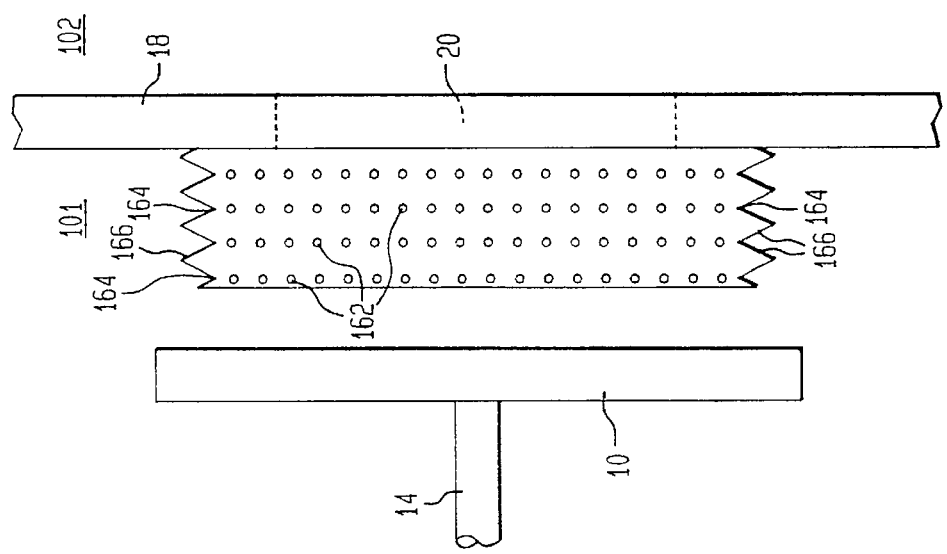
FIG. 3 is a side view of yet another valve assembly construction in the fully open position.

Although the invention has been described relative to a particular embodiment thereof, it is not so limited. For example, bellows 16 could be affixed only to disk 10 (as shown in the embodiment of FIGS. 1A, 1B and 1C), could be affixed only to valve plate 18 as shown in the embodiment of FIG. 2, or could be attached to both disk 10 and valve plate 18 as shown in the embodiment of FIG. 3. In terms of the embodiment of FIG. 3 as a valve assembly, note that flow will always be restricted as perforations 162 offer the only flow path. Thus, the embodiment of FIG. 3 illustrates that the present invention can be extended for use as a perforated bellows shock absorber connecting any two planar surfaces which are moved to cause bellows to be compressed therebetween. The fluid environment within and around the bellows, in cooperation with the size, shape and number of perforations in the bellows, determine the amount of shock absorption and noise reduction.

It will thus be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A valve assembly, comprising:

a disk;

a valve plate having a valve orifice therein;

a bellows disposed about said valve orifice between said disk and said valve plate, said bellows having side walls with perforations passing therethrough; and an actuator cooperating with said disk for moving said disk linearly with respect to said valve plate in one of a first direction and a second direction, wherein said disk causes compression of said bellows when said disk is moved in said first direction, and wherein said disk permits expansion of said bellows when said disk is moved in said second direction.

2. A valve assembly as in claim 1 wherein said bellows is attached to said disk.

3. A valve assembly as in claim 1 wherein said bellows is attached to said valve plate.

4. A valve assembly as in claim 1 wherein said bellows is attached to said disk and said valve plate.

5. A valve assembly as in claim 1 further comprising a seal positioned annularly about said valve orifice between said disk and said valve plate and forming a fluid-tight seal between said disk and said valve plate when said disk compresses said bellows.

6. A valve assembly as in claim 5 wherein said bellows is disposed about said seal.

7. A valve assembly as in claim 5 wherein said seal is supported on said disk.

8. A valve assembly as in claim 5 wherein said seal is supported on said valve plate.

9. A valve assembly as in claim 1 wherein said bellows has a plurality of annular inward and outward fold creases and wherein said perforations are located along said inward fold creases of said bellows.

10. A valve assembly as in claim 1 wherein said bellows is made from metal.

11. A shock reducing assembly for use in a fluid environment, comprising:
   a first planar surface;
   a second planar surface opposing said first planar surface; and
   a bellows disposed between said first planar surface and said second planar surface, said bellows having side walls with perforations passing therethrough, wherein a reduction in the distance between said first planar surface and said second planar surface results in compression of said bellows.

12. A shock reducing assembly as in claim 11 wherein said bellows is attached to at least one of said first and second planar surfaces.

13. A shock reducing assembly as in claim 12 wherein said bellows is attached to said first planar surface and said second planar surface.

14. A shock reducing assembly as in claim 11 wherein said bellows has a plurality of annular inward and outward fold creases and wherein said perforations are located along inward facing fold creases of said bellows.

15. A shock reducing assembly as in claim 11 wherein said bellows is made from metal.

* * * * *